US009434918B1

(12) United States Patent  (10) Patent No.: US 9,434,918 B1
Narasimhan et al.  (45) Date of Patent: Sep. 6, 2016

(54) SYSTEM FOR AGING BEER

(71) Applicants: Sandya Lakshmi Narasimhan, Costa Mesa, CA (US); Dave Narasimhan, Flemington, NJ (US); Joseph Francis Leibrandt, Costa Mesa, CA (US)

(72) Inventors: Sandya Lakshmi Narasimhan, Costa Mesa, CA (US); Dave Narasimhan, Flemington, NJ (US); Joseph Francis Leibrandt, Costa Mesa, CA (US)

( * ) Notice: Subject to any disclaimer, the term of this patent is extended or adjusted under 35 U.S.C. 154(b) by 0 days.

(21) Appl. No.: 14/669,504

(22) Filed: Mar. 26, 2015

(51) Int. Cl.
| F25D 29/00 | (2006.01) |
| C12H 1/22 | (2006.01) |
| C12C 12/00 | (2006.01) |
| C12H 1/16 | (2006.01) |
| F25D 17/04 | (2006.01) |
| F25D 31/00 | (2006.01) |

(52) U.S. Cl.
CPC ............... *C12H 1/22* (2013.01); *C12C 12/00* (2013.01); *C12H 1/16* (2013.01); *F25D 17/042* (2013.01); *F25D 31/007* (2013.01); *F25D 2317/04131* (2013.01); *F25D 2331/803* (2013.01); *F25D 2600/06* (2013.01)

(58) Field of Classification Search
CPC ............... F25D 17/042; F25D 31/007; F25D 2317/0413; F25D 2317/04131; F25D 2334/803; F25D 2600/06; F25D 2700/12
USPC .......................................... 62/247; 236/44 C
See application file for complete search history.

(56) References Cited

U.S. PATENT DOCUMENTS

| 4,979,377 | A | * | 12/1990 | Fievet .................. F25D 17/042 62/274 |
| 5,695,795 | A | | 12/1997 | Murray et al. ................... 426/11 |
| 5,962,045 | A | | 10/1999 | Rubelmann et al. ............. 426/8 |
| 5,974,815 | A | * | 11/1999 | Hwang .................. B60H 3/022 236/44 C |
| 6,062,107 | A | * | 5/2000 | Johnson .................. B67B 7/066 81/3.36 |
| RE36,897 | E | | 10/2000 | Murray et al. ................... 426/11 |
| 8,601,936 | B2 | | 12/2013 | Williams et al. ............... 99/281 |
| 8,899,428 | B2 | | 12/2014 | Monteserin ..................... 215/41 |
| 2006/0065612 | A1 | | 3/2006 | Gonneville ..................... 211/75 |
| 2006/0162360 | A1 | * | 7/2006 | McKibbin ............. A47F 3/0486 62/246 |
| 2007/0107458 | A1 | * | 5/2007 | Kim ..................... F25D 17/047 62/441 |
| 2009/0142458 | A1 | * | 6/2009 | McCann ................ A23B 4/066 426/231 |
| 2012/0189736 | A1 | | 7/2012 | Wallace et al. ................. 426/11 |
| 2012/0211907 | A1 | * | 8/2012 | Panda ...................... F24F 6/14 261/128 |
| 2012/0225167 | A1 | * | 9/2012 | Rasmussen .......... B65D 1/0207 426/106 |

OTHER PUBLICATIONS

"How to Cellar Beer." DRAFT Magazine. N.p., Sep. 28, 2010. Web. Jan. 19, 2016.*
Classy, Craft Beer Refrigerator—Found at: http://icemachinesblog.icemachinesplus.com/u-line-3036rrgl-a-classy-craft-beer-refrigerator/.

* cited by examiner

*Primary Examiner* — Jonathan Bradford
(74) *Attorney, Agent, or Firm* — Ernest D. Buff; Ernest D. Buff & Assoc LLC; Dave Narasimhan

(57) ABSTRACT

An insulated beer fridge stores and ages corked craft beer in a vertical orientation for a period of several months to years without degrading the cork stopper used to seal the bottle. Cork shrinkage is prevented by controlling the humidity within the beer fridge container within a range of 50% to 70% relative humidity. An optimal beer aging temperature in the range of 10° C. (50° F.) to 15.6° C. (60° F.) is maintained by a refrigeration system. Relative humidity within the beer fridge containment is actively maintained by a humidity replenishment mechanism. A controller calculates the amount of water needed to bring the relative humidity to 50% to 70% at the beer fridge temperature. Beers are stored in the beer fridge on trays, which can be pulled for removal of aged beer and addition of new corked craft beer.

19 Claims, 5 Drawing Sheets

$$VD = 5.018 + 0.32321 T_C + 0.0081847 T_C^2 + 0.00031243 T_C^3$$

| T° C | T° F | Vapor Density 100%RH (gms/m³) | Vapor Density 70%RH (gms/m³) | Vapor Density 50%RH (gms/m³) |
|---|---|---|---|---|
| 0 | 32 | 5.02 | 3.51 | 2.51 |
| 5 | 41 | 6.88 | 4.81 | 3.44 |
| 10 | 50 | 9.38 | 6.57 | 4.69 |
| 15 | 59 | 12.76 | 8.93 | 6.38 |
| 20 | 68 | 17.26 | 12.08 | 8.63 |
| 25 | 77 | 23.10 | 16.17 | 11.55 |
| 30 | 86 | 30.52 | 21.36 | 15.26 |
| 35 | 95 | 39.75 | 27.83 | 19.88 |
| 40 | 104 | 51.04 | 35.73 | 25.52 |

SYSTEM FOR AGING BEER

1. FIELD OF THE INVENTION

This system and method relates to a system for aging beer in order to enhance flavor and taste, which develop as a function of beer aging time.

2. DESCRIPTION OF THE PRIOR ART

There exist numerous prior art teachings related to storing and aging wine in dedicated wine storage compartments. Because wine bottles are generally stored in a horizontal orientation, this method is unsuitable for aging beer. Sediments and yeast tend to accumulate on the sides of a beer bottle over time. These substances can disperse throughout the liquid when the beer is poured, giving the beer an unpleasant taste and mouthfeel. Perhaps for this reason, there exist no disclosures pertinent to a system and method for successfully aging beer over a period of time in order to reliably develop enhanced taste and flavor. High end craft beers are generally corked using high quality cork harvested for commercial use primarily from *Quercus suber* (the Cork Oak), which is endemic to southwest Europe and northwest Africa. Even though cork is impermeable, it is highly compressible. When forced into the bottle top, cork creates a tight seal. However, the cork is subject to shrinkage via dehydration when the environmental humidity is reduced; this results in a poor seal, which may cause oxidation or contamination of the beer. Accordingly, aging of beer for long periods of time requires the prevention of cork shrinkage in order to maintain a proper seal at the bottle top; and such a process is not addressed by prior art disclosures.

Many patents and prior art documents relate to the aging of wine. Aging of wine requires different conditions including temperature and orientation of the wine bottle as compared to conditions required for aging beer. Wine bottles are generally stored in the horizontal orientation. Because the cork is in constant contact with the wine liquid, the cork remains hydrated and cork shrinkage is thereby prevented. Any leakage of wine at the cork during aging is noticeable as a rim residue, and its presence decreases the value of an aged wine. On the other hand, beer bottles are stored in a vertical orientation and the cork does not come in contact with the beer liquid. Therefore, the cork is subjected to shrinkage resulting in loss of a proper seal at the bottle top.

U.S. Pat. Nos. 5,695,795 and RE36,897 to Murray, et al. disclose methods for chill-treating non-distilled malted barley beverages. This process involves chill-treating by preparing a fermented malt beverage wherein brewing materials are mashed with water and the resulting mash is heated and wort is separated. The wort is boiled, cooled, and fermented, and the beer is subjected to a finishing stage which includes aging in order to produce the final beverage. The improvement comprises subjecting the beer to a cold stage by rapidly cooling the beer to a temperature of about its freezing point in such a manner that ice crystals are formed therein in only minimal amounts. The resulting cooled beer is then mixed for a short period of time with a beer slurry containing ice crystals, without any appreciable collateral increase in the amount of ice crystals in the resulting mixture. Finally, the treated beer is extracted from the mixture. This chill treating is conducted during the manufacture of beer, as opposed to chilling of already prepared bottled beer during aging and storage.

U.S. Pat. No. 5,962,045 to Rubelmann, et al. discloses a process for producing beers having yeast turbidity This process is for producing beers having yeast turbidity, in particular wheat beer, in which it is possible to metabolize virtually completely the oxygen, which has unavoidably passed into the container during packaging, and to perform continuous pasteurization integrated into the filling device. For this purpose, prior to packaging, yeast and beer wort are again added to the beer, and the yeast in the beer present in a package is destroyed within 24 hours of packaging. By this means, sterile beer having very high flavor stability can be produced, which is also suitable for sale of canned beer and for export even to distant countries. This patent disclosure does not provide aging of beer to enhance its flavor and taste.

U.S. Pat. No. 8,899,428 to Monteserin discloses a wine bottle in which the wine is in permanent contact with the cork. The bottle includes a main body and a bottle neck which accommodates a cork cap, where the bottle neck includes interior walls in contact with the cap and exterior walls not in contact with the cap. When the bottle is filled with wine and the bottle is in the vertical position, the fill level of wine reaches a point of the exterior walls of the bottle neck that is inside the bottle, causing the wine to be in permanent contact with the cork cap. Therefore, the construction allows for the possibility of not storing the bottle in horizontal position to guarantee the correct conservation of the wine and the cork. The primary problem with this arrangement is the inability to fill the bottle with wine beyond the tip of the bottleneck. The geometry as shown in the figures is not attained when the wine is filled into the bottle in the vertical orientation since the filled wine does not pour over the lip. The patent does not disclose an arrangement for aging beer.

U.S. Pat. No. 8,601,936 to Williams, et al. discloses a combined brewing system. The brewing system comprises a single pressurized vessel. The beer is naturally carbonated to the desired level during fermentation. Sediment is collected and substantially separated from within the vessel and removed from the vessel while the vessel is under pressure. Compressed gas is added for maintaining natural carbonation levels, so that the contents of the vessel can be drawn off at a desired pressure. The vessel has a temperature control system to selectively control the temperature during processing. This combined brewing system does not disclose aging of previously brewed and bottled beer in order to develop enhanced flavors and taste.

U.S. Patent Application 20060065612 to Gonneville discloses a bottle supporting structure. The bottle supporting structure pivotally supports a bottle relative to a reference surface, with the bottle including a bottle base and a substantially cylindrical liquid containing section extending from the bottle base; the bottle also includes a tapering section leading to a substantially cylindrical neck section. The neck section terminates into a pouring spout. The bottle supporting structure also includes a neck-supporting component for supporting the neck section so that the bottle lies on its side in a substantially horizontal orientation. A mounting assembly is provided for mounting the neck-supporting component in a spaced relationship relative to the reference surface. The neck-supporting component is pivotally attached to the mounting assembly so as to allow the bottle to rotate relative to the reference surface about a substantially vertical pivoting axis in a substantially horizontal pivoting plane.

U.S. Patent Application 20120189736 to Wallace, et al. discloses a temperature controlled fermenting container. The fermentation arrangement for fermenting a brew includes a vessel having an internal volume adapted to support fermentation of a brew contained therein. A settable energy device is arranged to deliver and extract energy respectively to and from the internal volume of the vessel. A temperature controller device controls the amount and period of energy delivery and extraction of the settable energy device to achieve a temperature within the vessel according to one or more modes of operation. The modes of operation include a storage mode associated with the end of fermentation, and the setting of energy in the storage mode is such as to maintain the fermented brew in a stable state. The fermentation container is not a previously fermented bottled beer and is not designed to age a bottled beer to develop and enhance flavors and taste.

Web disclosure at http://icemachinesblog.icemachinesplus.com/u-line-3036rrgl-a-classy-craft-beer-refrigerator/ discloses a Classy, Craft Beer Refrigerator. This refrigerator provides varying temperature requirements meeting most microbrewed craft beers with two distinct and separate temperature zones. Air is forced around the entire cabinet, ensuring that all items remain at a uniform temperature no matter their position in the cabinet. The humidity in the refrigerator is not controlled thus allowing corked beers to be potentially damaged due to cork shrinkage and ingress of air.

There remains a need in the art for an effective and reliable means to age high quality beer for prolonged periods in order to develop enhanced flavor and taste. The aging method should be able to accommodate 750 ml beer bottles while maintaining vertical or upright orientation.

3. SUMMARY OF THE INVENTION

The beer aging system of the present invention stores and ages craft beer bottles having a volume of 750 ml and smaller that are corked. Craft beers are often unpasteurized and produced in a manner that leaves varying degrees of sediment in the bottle. The sediment present within beer will settle during aging and should not be poured into the drinking glass when serving aged craft beer. This is accomplished by storing the beer in a vertical orientation to allow the sediment to precipitate to the bottom of the bottle. Proper aging occurs in a temperature and humidity controlled refrigerator maintaining temperature within the range of 10° C. (50° F.) to 15.6° C. (60° F.) and relative humidity within the refrigerator actively maintained in the range of 50 to 70 percent. The opening of the refrigerator has a close fitting front door having a darkened glass panel preventing the exposure of the beer contained within the bottles to direct or indirect sunlight or any form of light having energetic wavelengths beyond green. Optionally a red (approximately 650 nm wavelength) or green (approximately 510 nm wavelength) lamp is provided within the refrigerator that illuminates the contents within the refrigerator when the darkened glass door is opened enabling easy visualization for placement and/or removal of beer within the refrigerator.

A control system actively controls the beer fridge temperature in the range of 10° C. (50° F.) to 15.6° C. (60° F.) and beer fridge humidity in the range of 50% to 70% relative humidity levels. The control of temperature is accomplished by having a user settable thermal set point knob placed within the interior or outside surface of the beer fridge. A temperature measurement sensor device is placed within the interior of the beer fridge. The sensor may be a thermocouple, a solid state chip or others. The sensor-measured temperature in combination with the user selected thermal set point value is communicated to the control system to actively control the beer fridge temperature. The cooled air within the beer fridge is circulated around the stored bottles of beer ensuring that the beer bottles are stored at the selected temperature.

Active control of humidity is maintained by the controller. The humidity control system is connected to a humidity sensor located within the interior of the beer fridge. The humidity sensor may be a capacitor thin polymer film device, a resistive humidity sensor, or a thermal conductivity humidity sensor. Having been connected to a temperature sensor, the controller knows the temperature within the beer fridge. A calculator portion of the controller computes the dew point humidity in grams of water present in one cubic meter of air at the beer fridge temperature first and determines the desired water content for 50% to 70% relative humidity. When the humidity sensor measures a relative humidity less than 50%, the controller activates humidity replenishment means to bring the relative humidity in the 50% to 70% range. The humidity replacement means may be an atomized water spray or other means including evaporation of water from a porous substrate soaked in water.

When the darkened door is opened, the humidity levels within the refrigerator change according to the ambient humidity of the air in the environment. Because the air brought into the cooling unit of the refrigerator is drawn from ambient room air, it has nearly the same humidity as the ambient air. If the ambient air's humidity is low, it is replenished by a humidity replenishment means. If the ambient humidity levels are too high, the process of bringing in and cooling air to the temperature of the beer fridge will already condense the excessive humidity into water droplets on the refrigeration coils, which is then allowed to drip down into a collection tray for disposal.

The interior of the refrigerator is enclosed completely except for entry of refrigerated cold air which maintains temperature of the refrigerator and a small opening to exhaust the cold air in order to prevent pressure build up within the closed beer fridge. The relative humidity of the cooled air entering the beer fridge generally has a lower relative humidity than that which is required for preventing the shrinkage of the cork used to seal the beer bottles. Accordingly, the relative humidity within the beer fridge needs to be increased to 50 to 70% percent.

A hinged glass door may be used to close the front opening to the beer fridge and may be opened or closed to access the trays that hold the beer bottles. In an alternate embodiment, the glass door may be a sliding glass door which may be opened and closed by sliding the individual sliding glass door panels. The hinged or sliding glass door is made of dark colored glass such as brown or green to prevent the stored beer from being exposed to ambient light or sunlight. The brown to green glass door absorbs all blue and ultraviolet radiation present in the room light or sunlight preventing exposure of beer stored in the beer fridge to become spoiled. A colored light with wavelength in the range of 510 nm to 650 nm may be provided within the beer fridge interior to view the vertically stored beer bottles.

The beer bottles are stored in a vertical orientation in parallel drawers or trays mounted on sliding rails. The drawers are pulled out one at a time after opening the hinged glass door or sliding glass doors, enabling addition of new beer bottles or removal of previously aged beer bottles. The drawer is pushed back and the glass door is shut. The trays slide freely forward while supported by bearings and the trays have lateral support preventing the beer bottles from tipping over. All the beer bottles are loaded in vertical orientation allowing sediment in the beer to settle to the bottom of the bottles.

Significant advantages are realized by practice of the present invention. In a preferred embodiment, the system for aging beer of the present invention comprises:
1) a container having a sealed enclosure with a darkened glass front door in order to prevent exposure of the stored beer to blue or ultraviolet rays or sunlight, the exposure of which can degrade beer rapidly;
2) said beer fridge maintained at a temperature of 10° C. (50° F.) to 15.6° C. (60° F.) by a controller located within the beer fridge;
3) said controller additionally maintains the beer fridge interior relative humidity in the range of 50% to 70%;
4) said controller temperature maintaining subsystem comprising a thermal sensor and a temperature set point knob driving a cooling refrigeration machine or a thermoelectric cooler driving and circulating cooled air with a fan into the interior of beer fridge;
5) said controller humidity maintaining subsystem comprising a humidity sensor measuring relative humidity of the beer fridge interior and if the relative humidity measured is less than 50%, the humidity maintaining subsystem calculates using equation (A): $VD=5.018+0.32321\,T+0.0081847T^2+0.00031243T^3$ wherein VD in grams per cubic meter of air at 100% relative humidity and T is beer fridge temperature and computing the amount of water per cubic meter to be injected into the interior of the beer fridge by the humidity replacement means to bring the relative humidity in the range of 50% to 70%;
6) said humidity replenishment means comprising an atomized water spray or soaked porous pad and steam evaporation delivering a calculated magnitude of water into the cooled air supply path of the beer fridge;
7) said beer fridge having a plurality of corked beer bottles stored on plurality of sliding trays for removing an aged beer or adding new beer;
8) said beer fridge having an interior light which illuminates the interior of the beer fridge at a wavelength in the range of 510 to 650 nanometers when the front door is opened;

whereby said beer fridge has the optimal beer aging temperature, and the amount of relative humidity maintained within the beer fridge preventing the shrinkage of the cork thus preventing leakage of air and spoilage of beer.

4. BRIEF DESCRIPTION OF THE DRAWINGS

The invention will be more fully understood and further advantages will become apparent when reference is made to the following detailed description of the preferred embodiments of the invention and the accompanying drawings, in which.

5. DETAILED DESCRIPTION OF THE INVENTION

Figure 1:
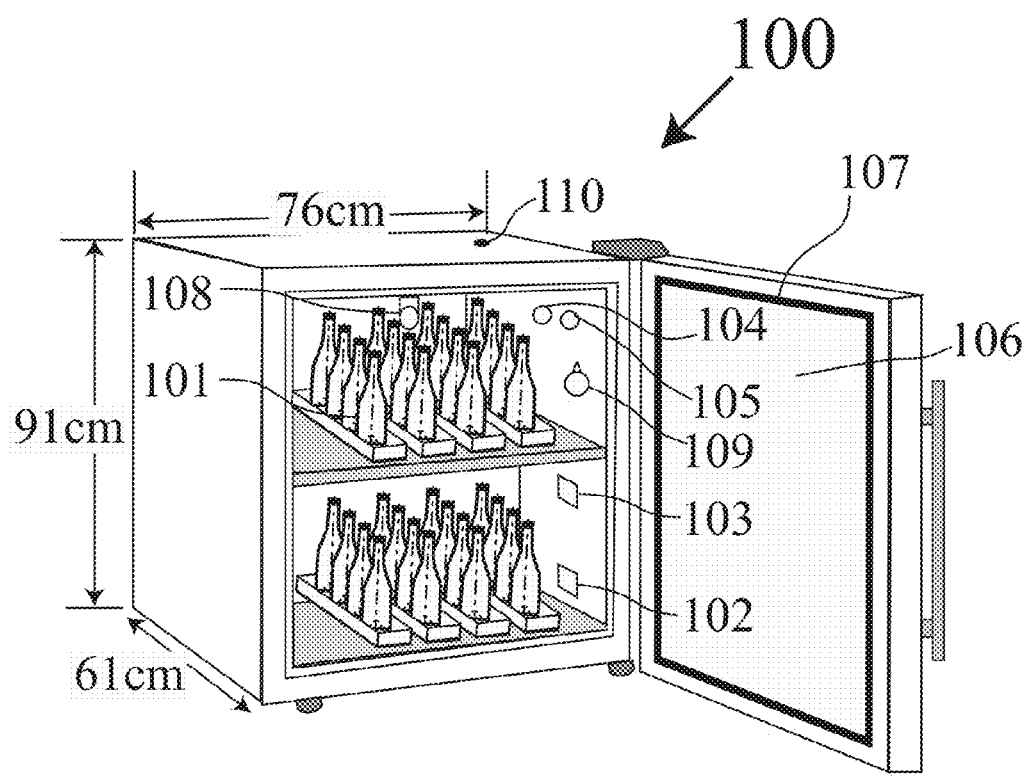
FIG. 1 illustrates a compact beer fridge capable of storing corked beer in a plurality of trays.

This invention relates to a fridge system designed to age corked high quality beer for prolonged periods, typically several years in order to develop enhanced flavor and taste. The craft beers are typically sealed using high quality cork. Craft beers are often unpasteurized and produced in a manner that leaves varying degrees of sediment in the bottle in the finished beer product. This sediment consists mostly of yeast but also of malt protein complex. The sediment present within beer will settle during aging and should not be poured into the drinking glass when serving aged craft beer because the sediment has an undesirable taste, mouthfeel, and appearance. This is accomplished by storing the corked beer bottles in a vertical orientation, which allows the sediment to settle at the bottom of the beer bottles.

Proper aging of craft beer requires specific conditions including temperature in the range of 10° C. (50° F.) to 15.6° C. (60° F.). The beer contained in the bottles degrades rapidly when exposed to sunlight or radiation with energy beyond green, typically blue and ultraviolet radiation, of wavelengths in the 400-500 nanometer range. It is well known that exposure to light of these wavelengths causes photochemical rearrangement of hop resins which results in a pronounced skunky flavor that ruins the taste and value of the aged beer. Additionally, if the cork used to seal the bottle shrinks even minimally, oxygen can enter and also can produce off flavors and a foul taste.

Depending on the style of the beer, there are distinct temperatures used for storing and aging craft beer. In general, higher alcohol beers are stored, aged, and served at higher temperatures and conversely, lower alcohol beers are stored, aged, and served at lower temperatures. Additionally, higher alcohol beers can be stored and aged for many years in order to develop enhanced flavor and taste. Strong beers such as barleywines, tripels, and dark ales are best stored and aged at 55-60° F. while most standard beers such as bitters, IPAs, doppelbocks, lambics, and stouts are best stored and aged at 50-55° F. Lighter beers such as lagers, pilsners, and wheat beers tend to lose aromatic flavors when stored for longer periods but can be aged for shorter periods of time at temperatures of 45-50° F.

In view of these requirements, the cork used to seal the bottle needs to be prevented from shrinking throughout the aging period. The integrity of the cork must be maintained throughout the aging period.

Cork is a material with unique properties. High quality cork is harvested for commercial use primarily from the bark of *Quercus suber* (the Cork Oak), which is endemic to southwest Europe and northwest Africa. It is impervious to water providing an ideal material for sealing. Being an isotropic material, it shrinks uniformly at relative humidity levels below 50%, unlike wood which shrinks along the grains. Even though cork is impermeable, it is highly compressible and when forced into the bottle top creates a seal. The cork is subject to shrinkage when the humidity in the environment is reduced resulting in a poor seal at the bottle top. Accordingly, the humidity in the beer fridge must be controlled to a relative humidity value of 50% to 70% for the cork to be preserved while enabling storage of corked craft beer for many years.

FIG. 1 illustrates at 100 a compact beer fridge capable of storing corked beer vertically in a series of trays 101. The trays 101 carry plurality of corked bottles of craft beer. Note that the trays have a side lip to prevent tilting and dislodgement of stored beer bottles. Cold air from a refrigeration unit, which may be a refrigeration compressor or a thermoelectric cooler, enters the beer fridge chamber at 102. A temperature sensor is shown at 104. This temperature sensor may be a thermocouple, a thermistor or a resistance thermometer. The humidity sensor is shown at 105. The humidity sensor may be selected from a capacitive thin polymer film humidity sensor, resistive humidity sensor, or a thermal conductivity humidity sensor. Humidity adjustment is delivered at 103. This may be a spray nozzle delivering a known quantity of mist of water, a porous medium evaporating a known quantity of water, or a steam generator volatilizing a known quantity of water. The darkened glass of the front door of the beer fridge is shown at 106. The color of the darkened glass may be green to dark brown, transmitting wavelengths in the range of 510 nm to 650 nm, and is of a color that does not admit white light, blue light, ultraviolet light, nor sunlight into the beer fridge since these light wavelengths will degrade craft beer. A door seal is shown at 107. The seal may be sponge rubber or a rubber tube that is compressible. A beer fridge interior light is shown at 108 providing the ability to view the stored bottles of craft beer. The light 108 is generally a light transmitting 510 to 650 nm wavelength, typically of green color. A knob 109 is provided within the interior of the beer fridge to set the beer fridge cabin temperature in the range of 10° C. (50° F.) to 15.6° C. (60° F.). A vent hole is provided at 110 to prevent pressure build up within the beer fridge since the sealing provided by seal 107 is expected to be very good. Any pressure build up will dislodge the beer fridge's front glass door.

Figure 2:
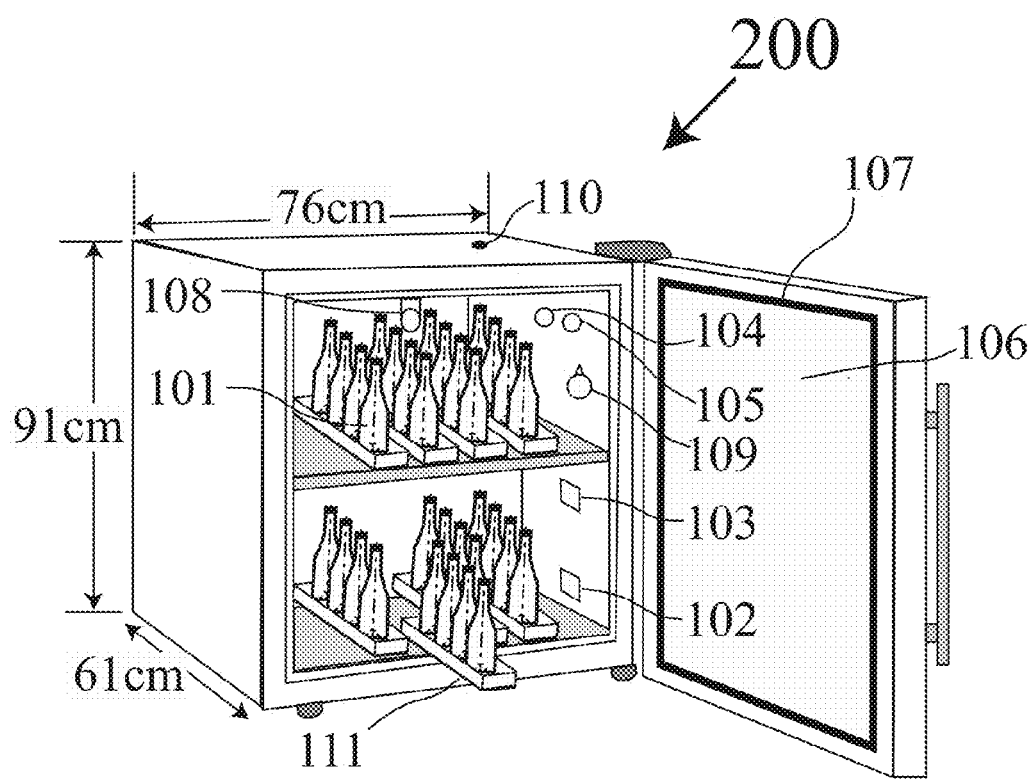
FIG. 2 illustrates the beer fridge of FIG. 1 wherein one of the trays carrying corked beer bottles is pulled out for adding new bottled beer or removing an aged bottled beer.

FIG. 2 illustrates at 200 the beer fridge of FIG. 1 wherein one of the trays carrying corked beer bottles is pulled out at 111 for adding new bottled beer or removing an aged bottled beer. Identical numerical indicia are used for convenience.

Figure 3:
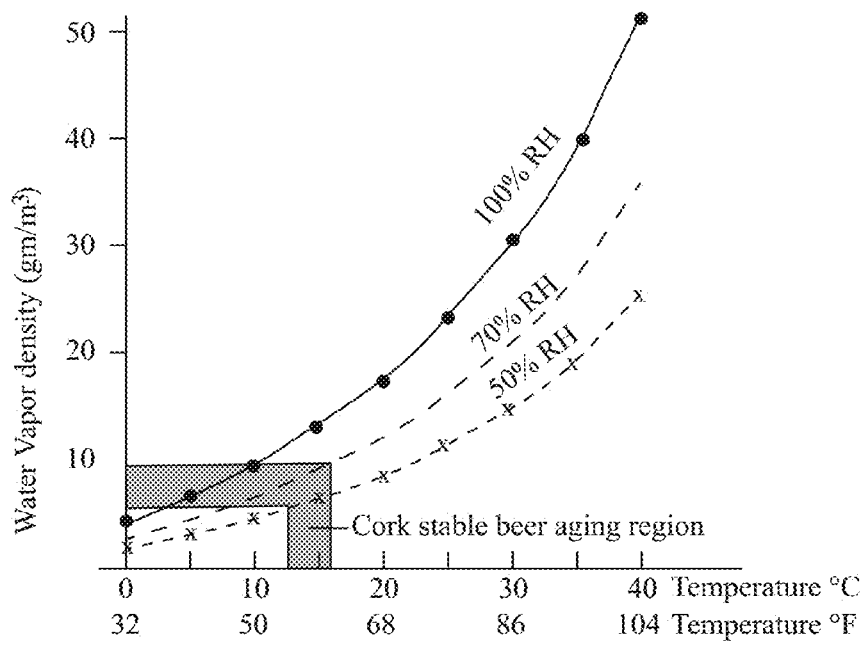
FIG. 3 illustrates the humidity carried by air within the beer fridge containment volume as a function of temperature in the form of an equation, a table and an illustrative figure at 100% relative humidity, 70% relative humidity, and 50% relative humidity.

FIG. 3 illustrates the humidity carried by air within the beer fridge containment volume as a function of temperature in the form of an equation, a table and an illustrative figure at 100% relative humidity, 70% relative humidity and 50% relative humidity. The equation is obtained from web reference http://hyperphysics.phyastr.gsu.edu/hbase/kinetic/relhum.html#c3. A plot of water vapor density VD as a function of temperature at 100% RH, 70% RH, and 50% RH is shown. A shaded portion representing the cork stability and beer aging region which encompasses temperatures in the range of 10° C. (50° F.) to 15.6° C. (60° F.) and relative humidity in the range of 50% RH to 70% RH is shown. Since the relative humidity requirement is between 50% RH to 70% RH when the beer fridge is kept at a temperature of 10° C. (50° F.) to 15.6° C. (60° F.), the shaded portion shows the cork stable region of operation for the beer fridge.

Figure 4:
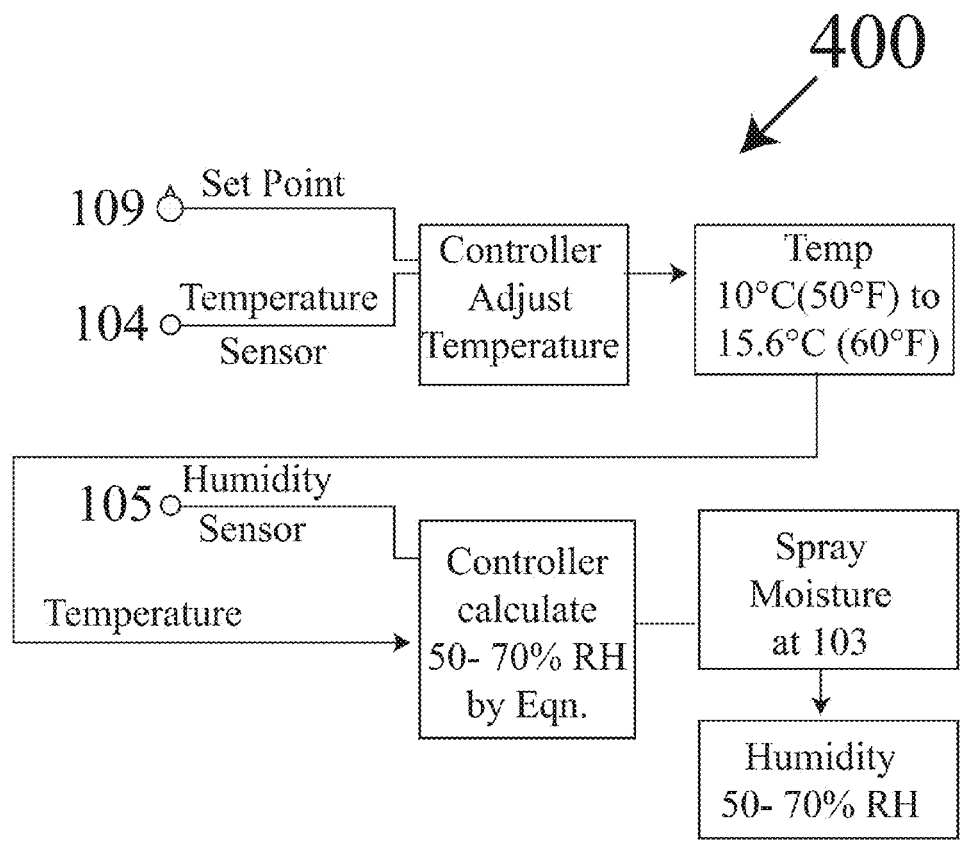
FIG. 4 illustrates the control algorithm of the beer fridge system regulating the temperature and humidity within the beer fridge containment volume.

FIG. 4 illustrates the control algorithm of the beer fridge system regulating the temperature and humidity within the beer fridge containment volume. The controller is contained within the beer fridge equipment and is therefore invisible and is not shown in FIGS. 1 and 2. A controller receives the measured temperature from temperature sensor 104 and the selected temperature set point from knob 109 adjusts the temperature of delivery of cooled air through port 102 of the beer fridge. In order to deliver cooled air at a temperature of 10° C. (50° F.) to 15.6° C. (60° F.), the air has to be additionally cooled; thus any humidity contained in ambient air is condensed in the refrigeration coils or thermoelectric cooling elements and the condensed water is then discharged or drained.

The controller additionally has a humidity control function, which receives measured relative humidity from the humidity sensor and also receives the measured beer fridge air temperature T. The dew point VD in grams per cubic meter of air at this air temperature T is computed using the equation (A) shown below:

$$VD = 5.018 + 0.32321T + 0.0081847T^2 + 0.00031243T^3$$

Next the humidity values at 70% RH and 50% RH are calculated. Since VD is in grams per cubic meter, the known volume of the beer fridge allows the exact amount of additional water to be calculated in order to bring the relative humidity to the 50-70% RH range. The water can be delivered in the form of fine mist, steam spray, or evaporated water injected through the port 103.

For example, if the measured temperature is 11° C. (51.8° F.), according to the equation or the plot of FIG. 3, the VD is 9.98 grams per cubic meter, representing 100% relative humidity. A 70% RH value of VD is 6.99 grams per cubic meter and a 50% RH value of VD is 4.99 grams per cubic meter. If the humidity measured at a beer fridge temperature by the humidity sensor is 27%, the VD content of air is 9.98×27% or 2.49 grams per cubic meter. The amount of water needed to bring the relative humidity to 70% value is 6.99−2.49 or 4.50 grams of water per cubic meter. If the volume of the beer fridge is 1.5 cubic meter, the amount of water that has to be atomized and injected into the beer fridge chamber is (1.5×4.50) or 6.75 grams.

Figure 5:
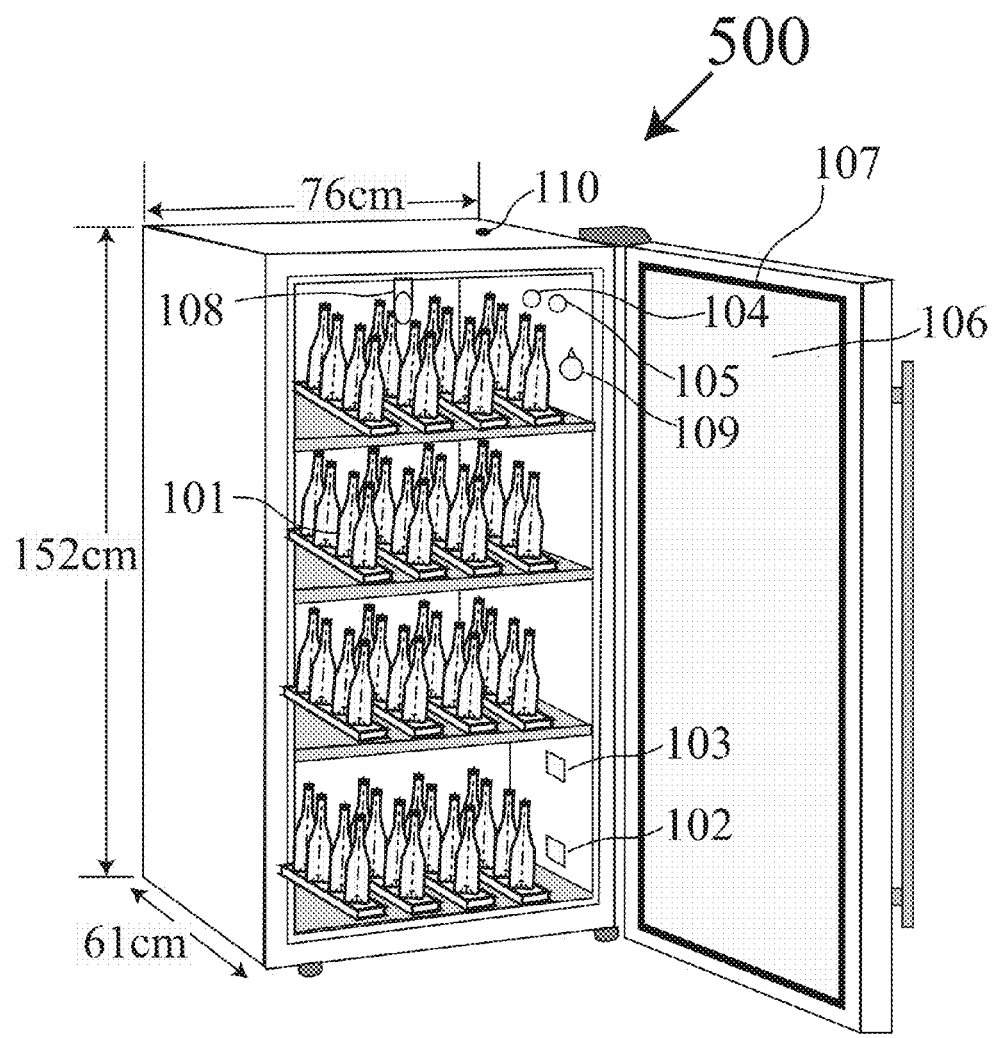
FIG. 5 illustrates a larger sized beer fridge capable of storing a large number of corked beers in a series of trays.

FIG. 5 illustrates at 500 a larger sized beer fridge capable of storing a large number of corked beer bottles in a series of trays. Identical numerical indicia as in FIGS. 1 and 2 are used for convenience. This larger beer fridge can age a greater number of corked craft beer bottles.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An insulated beer refrigerator system, comprising
    a. a beer refrigerator container having a sealed enclosure with a darkened green glass front door preventing exposure of stored beer to blue or ultraviolet rays or sunlight, which can degrade beer rapidly;
    b. said beer refrigerator system having a temperature maintaining subsystem keeping beer refrigerator interior temperature in the range of 10° C. (50° F.) to 15.6° C. (60° F.) and having a humidity maintaining subsystem, keeping beer refrigerator interior relative humidity in the range of 50% to 70%, said subsystems working in combination;
    c. said temperature maintaining subsystem comprising a thermal sensor and a knob for setting a temperature set point associated with a cooling system, for driving and circulating cooled air into the interior of the beer refrigerator;
    d. said humidity maintaining subsystem comprising a humidity sensor for measuring relative humidity of the beer refrigerator interior, and being operative when the relative humidity measured is less than 50% to cause the humidity maintaining subsystem to calculate, using an equation (A) with measured beer refrigerator temperature, an amount of water per cubic meter to be injected into the interior of the beer refrigerator by a humidity replacement means to bring the relative humidity in the range of 50% to 70%;

e. said humidity replacement means delivering the calculated amount of water into the cooled air supply path of the beer refrigerator;

f. said beer refrigerator having a plurality of corked craft beer bottles stored vertically on a plurality of sliding trays, wherein the sliding trays provide for removal of an aged beer or adding new beer;

g. said beer refrigerator having an interior light with wavelength in the range of 510 nm to 650 nm, for illuminating the interior of the beer refrigerator when the front door is opened;

whereby said beer refrigerator has an optimal beer aging temperature and the amount of relative humidity maintained in combination by a control system within the beer refrigerator inhibits cork shrinkage, which prevents ingress of air and spoilage of beer.

2. The insulated beer refrigerator system as recited by claim 1, wherein said darkened green glass front door allows light only of wavelengths ranging from 510 nm to 650 nm.

3. The insulated beer refrigerator system as recited by claim 1, wherein said cooled air is circulated around the stored beer bottles using an air-circulating fan.

4. The insulated beer refrigerator system as recited by claim 1, wherein the temperature sensor is a thermocouple.

5. The insulated beer refrigerator system as recited by claim 1, wherein the temperature sensor is a resistance thermometer.

6. The insulated beer refrigerator system as recited by claim 1, wherein the humidity sensor is a thin polymer film capacitor.

7. The insulated beer refrigerator system as recited by claim 1, wherein the humidity sensor is a resistive humidity sensor.

8. The insulated beer refrigerator system as recited by claim 1, wherein said front door is hinged at one end.

9. The insulated beer refrigerator system as recited by claim 1, wherein said front door is a sliding glass door.

10. The insulated beer refrigerator system as recited by claim 1, wherein said control system drives a cooling system that is a refrigeration machine capable of cooling contents only in the range of 10° C. (50° F.) to 15.6° C.

11. The insulated beer refrigerator system as recited by claim 1, wherein said control system drives a cooling system that is a thermoelectric cooler.

12. The insulated beer fridge system as recited by claim 1, wherein said humidity replacement means is an atomized spray of a calculated magnitude of water into the beer refrigerator interior.

13. The insulated beer refrigerator system as recited by claim 1, wherein said humidity replacement means is volatilized steam of a calculated magnitude of water into the beer refrigerator interior.

14. The insulated beer refrigerator system as recited by claim 1, wherein a soaked porous substrate evaporates a calculated magnitude of water into the beer refrigerator interior.

15. The insulated beer refrigerator system as recited by claim 1, wherein said container has a vent hole to prevent pressure build up within the beer refrigerator interior.

16. The insulated beer refrigerator system as recited by claim 1, wherein said corked craft beer bottles are about 750 ml.

17. The insulated beer refrigerator system as recited by claim 1, wherein said corked craft beer bottles are smaller than 750 ml.

18. The insulated beer refrigerator system as recited by claim 1, wherein said beer refrigerator has a dimension of about 96 cm×76 cm×62 cm, small enough to fit within a home.

19. The insulated beer refrigerator system as recited by claim 1, wherein said beer refrigerator has a dimension of about 152 cm×76 cm-×62 cm, large enough to store and age craft beer in a beer pub or restaurant.

* * * * *